United States Patent [19]

Koike

[11] 4,089,134
[45] May 16, 1978

[54] WINDOW GUIDE MECHANISM FOR A TIGHT AIR SEAL OF A VEHICLE WINDOW ASSEMBLY

[75] Inventor: Shyouichi Koike, Seki, Japan

[73] Assignee: Nissan Motor Company, Limited, Japan

[21] Appl. No.: 711,210

[22] Filed: Aug. 3, 1976

[30] Foreign Application Priority Data

Aug. 5, 1975 Japan .................................. 50-95227

[51] Int. Cl.² ............................................ E05F 11/52
[52] U.S. Cl. ...................................... 49/227; 49/374; 49/377
[58] Field of Search ................... 49/40, 227, 348, 372, 49/374, 375, 376, 377

[56] References Cited

U.S. PATENT DOCUMENTS

| | | | |
|---|---|---|---|
| 2,844,405 | 7/1958 | Roethel | 49/40 |
| 3,591,982 | 7/1971 | Nantau | 49/375 X |
| 3,844,064 | 10/1974 | Yamaha et al. | 49/375 X |

FOREIGN PATENT DOCUMENTS 1,303,308   7/1962   France ................................. 49/377

*Primary Examiner*—Kenneth Downey
*Attorney, Agent, or Firm*—Robert E. Burns; Emmanuel J. Lobato; Bruce L. Adams

[57] ABSTRACT

A guide track is divided into upper and lower sections, the lower section having a radius of curvature equal to that of a curved window pane to be guided along the guide track, and the upper section having a radius of curvature which is substantially greater than that of the window pane.

3 Claims, 10 Drawing Figures

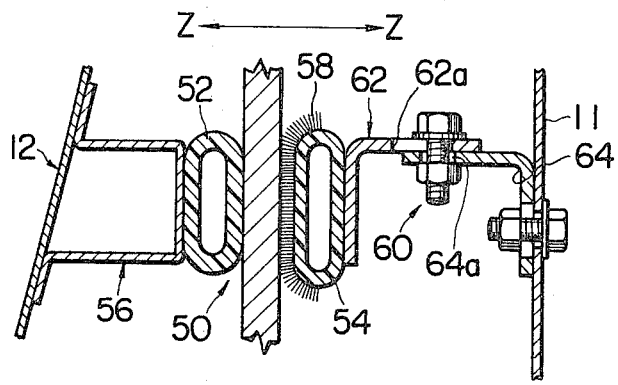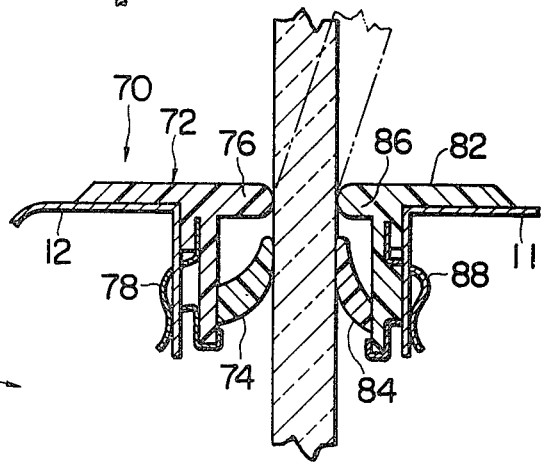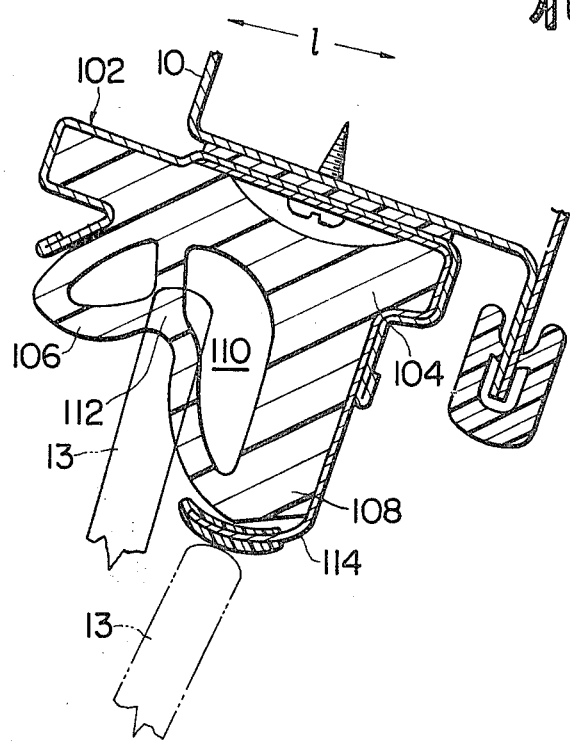

WINDOW GUIDE MECHANISM FOR A TIGHT AIR SEAL OF A VEHICLE WINDOW ASSEMBLY

BACKGROUND OF THE INVENTION

This invention relates generally to vehicle window guide arrangement and in particular to guide mechanisms for guiding curved window panes of vehicle body door or body side windows along vertical elongate guide tracks.

It is a general practice that in the window guide mechanism of the aforementioned type, the radii of curvature of the window pane and guide track are substantially equal to one another. However, it is desirable that, as the window pane approximates its raised closed position, it slants inboard by a degree greater than obtained by a guide track having a radius of curvature equal to that of the window pane. This is because the window pane, slanting inboard by an elevated degree, is tightly pressed at its upper edge against an inboard lip of a window weatherstrip. The inboard lip then urges the window pane toward its outboard lip by virtue of its resilient reaction, providing an extremely tight fluid seal between the window pane and the weatherstrip.

SUMMARY OF THE INVENTION

It is therefore an object of this invention to provide an improved guide mechanism for slidable curved window panes of automotive vehicles which mechanism enables the window pane at its raised position to slant inboard by a predetermined degree providing an increased air seal effect.

Another object of this invention is to provide an improved guide mechanism of the type described in which the guide track is divided into two sections, the lower one of which has a radius of curvature substantially equal to that of the window pane and the upper one of which has a radius of curvature substantially greater than that of the window pane.

A further object of this invention is to provide an improved guide mechanism of the type described in which the window pane slanted inboard at its raised position is tightly pressed against an inboard lip of a window weatherstrip, which in turn resiliently urges the window pane outboard of same.

A still further object of this invention is to provide an improved guide mechanism of the type described in which a weatherstrip is provided between the window pane and an upper edge portion of a window storage space forming a fixed fulcrum about which the rising window pane is slanted inboard.

A still further object of this invention is to provide an improved guide mechanism of the type described in which a locational relationship of the window pane with respect to the guide track is adjustable to compensate for change in this relationship resulting from inboard slanting of the window pane.

BRIEF DESCRIPTION OF THE DRAWINGS

These and other objects, features and advantages of this invention will become more apparent from the following description when taken in conjunction with the accompanying drawings, in which:

FIG. 8 is an enlarged detailed view showing a stabilizer assembly of FIG. 4 mechanism;

FIG. 9 is an enlarged view showing a weatherstrip of FIG. 4 mechanism; and

FIG. 10 is an enlarged detailed view showing another weatherstrip of the FIG. 4 mechanism.

DESCRIPTION OF THE PREFERRED EMBODIMENTS

Figure 1:
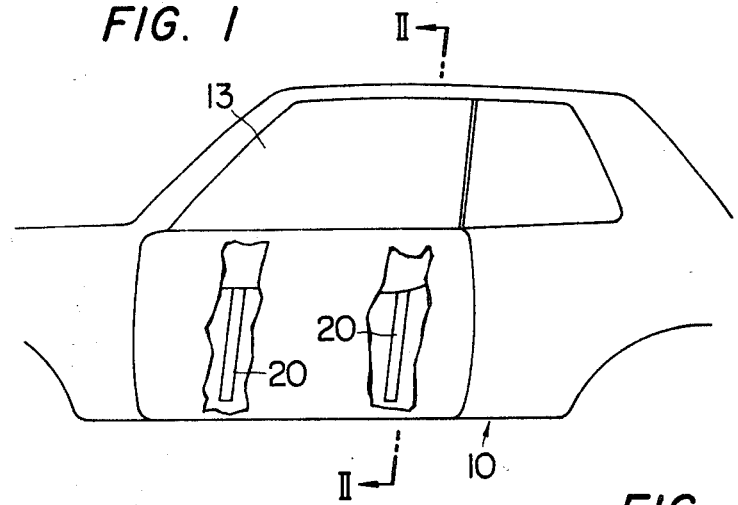
FIG. 1 is a schematic view generally showing a part of a vehicle body equipped with a door window guide mechanism.
Figure 2:
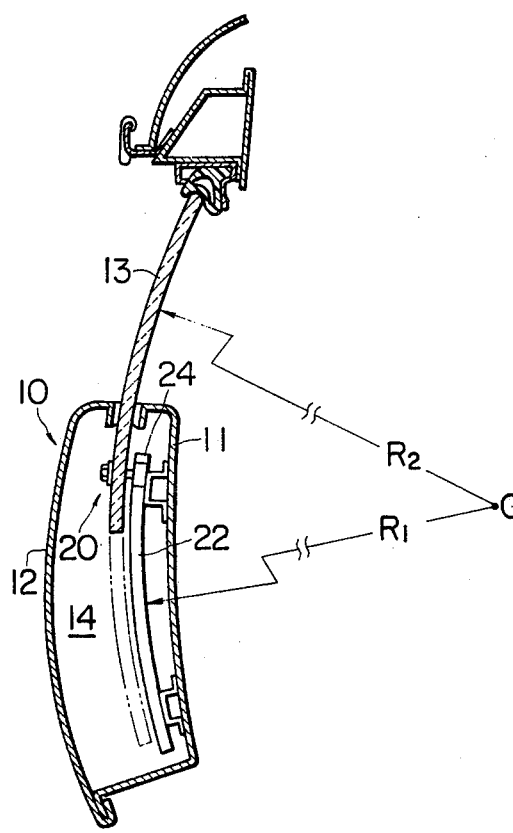
FIG. 2 is a vertical section taken along line II—II of FIG. 1 showing a prior art window guide mechanism.

According to FIGS. 1 and 2, a body 10, for instance, a hard-top type passenger car comprises a body door (no number) which defines a window storage space 14 between an inner door panel 11 and an outer door panel 12. A window pane 13 of a door window assembly is moved between a raised closed position and a lowered open position out of and into the window storage space 14 by means of a window guide mechanism 20. The mechanism 20 essentially consists of a guide track 22 mounted on the inner panel 11 and a guide follower 24 secured to the window pane and engageably guided by the guide track.

According to the prior art structure shown, the guide track 22 has a desired radius of curvature $R_1$ about the center point of curvature O, and the window pane 13 also has a radius of curvature $R_2$ about the same point O which is equal to the radius of curvature $R_1$ of the guide track 22. Consequently, the window pane is maintained parallel with the guide track throughout the total length of its guiding path.

Fluid tightness between the upper peripheral edge of the raised window pane and the body defining window opening is achieved by a window weatherstrip mounted on the vehicle body in a known manner. In most cases, however, the air seal effect is insufficient in such a device shown, particularly when the vehicle is running at an elevated speed. This is because, during such high-speed operation of the vehicle, the pressure on the inboard window pane surface considerably exceeds the pressure acting on outboard window pane surface located in the low pressure area proximate the outer skin of the moving vehicle. This pressure differential causes air leakage from the high-pressure area on the inboard window pane surface of the low-pressure area through a small clearance between the window pane and the weatherstrip, producing a harsh whistling noise. Also, lateral outward movement of the window pane due to this pressure differential results rattling the same.

A better air seal is obtained by more forcefully urging the window pane against the inboard portion of the resilient weatherstrip as already mentioned. To slant the guide track inboard would be an expedient for such fluid tightness. This however results in the lateral width of the window storage space being increased by a degree corresponding to the increased angle of slant of the guide track, and accordingly an increased door thickness is required. Therefore an undesirably limited space in the occupant compartment is available.

Figure 3:
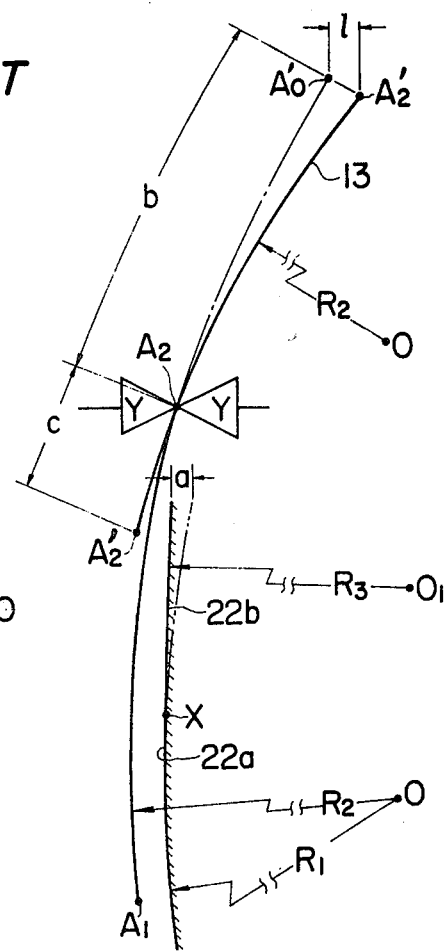
FIG. 3 is a view illustrating a basic operation principle of a window guide mechanism according to this invention.

Reference being now made to FIG. 3 illustrating the basic principle of this invention, in which the window pane 13 has the radius of curvature $R_2$ about the center of curvature O, the guide track 22 is divided at point X into two sections. While the lower section 22a has the radius of curvature $R_1$ which is substantially equal to the radius of curvature $R_2$ of the window pane, the upper section 22b has the radius of curvature $R_3$ which is substantially greater than $R_2$. The window pane is supported at a fixed fulcrum Y—Y and passes through it at each rising and lowering movement.

The window pane assumes the lowered open position between points $A_1$ and $A_2$. As the window pane is raised toward the closed position, the point $A_1$ is moved along a guide path having the radius of curvature $R_1$ toward the point X and then along another guide path having the radius of curvature $R_3$ until it reaches the point $A_1'$. At the same time, the point $A_2$ reaches the point $A_2'$. The point $A_2'$ is remote by a distance $l$ from point $A_0'$ which the point $A_2$ should have reached if the window pane followed the path having the radius of curvature $R_1$ throughout its rising movement. The value $l$ is given by the following equation $$c/b = a/l$$

wherein $a$ is a distance between a guide path having the radius of curvature $R_3$ and that having $R_1$, $b$ is a length from the point Y—Y to the point $A_2'$ in the raised position of the window pane, and $c$ is a length from the point Y—Y to the point $A_1'$ in the raised position of the window pane. Thus, the distance $l$ is given by properly selecting the values $a$, $b$ and $c$. It is preferable to so locate the point X that the slant angle of the window pane suddenly increases as it approximates its uppermost position. This is to prevent too much lateral deviation of the plane containing the window pane from a plane containing window panes of other window assemblies on the same side of the vehicle body, for instance of a rear door window or a rear quarter window, if the window pane 13 is assumed to be that of a front door window assembly.

Figure 4:
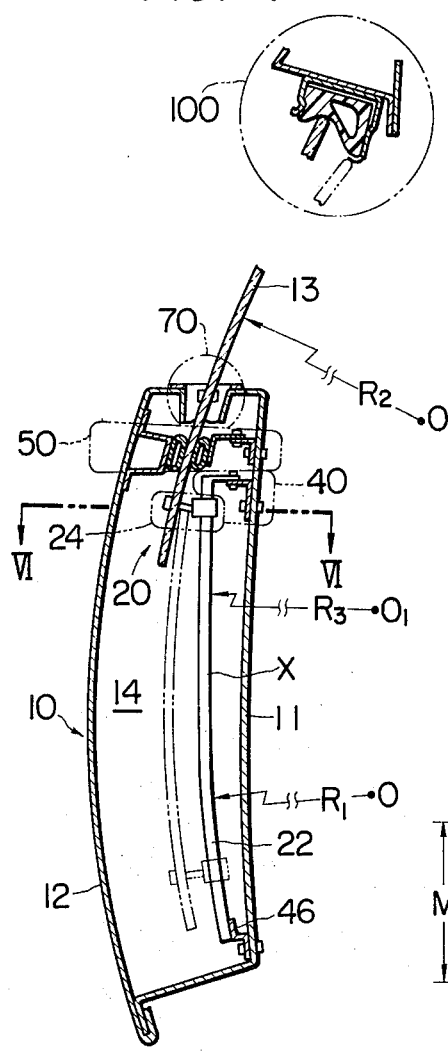
FIG. 4 is a vertical section showing a preferred embodiment of a window guide mechanism incorporating the operation principle shown in FIG. 3.

FIG. 4 shows a preferred embodiment incorporating the principle explained above in connection with FIG. 3. As shown, the guide track 22 designed in accordance with the principle of FIG. 3, is mounted on the inner panel 11 by means of an adjustable mounting device 40. The lower peripheral edge of the window pane is adjustably secured to a guide follower assembly 24 which engagingly follows the guide track during up and down movement of the window pane. The window pane passes at each up and down movement through a weatherstrip 70 mounted on the upper edges of the inner and outer panels 11 and 12 defining the window storage space 14, the weatherstrip 70 forming the fulcrum point Y—Y of FIG. 3. Provided between the weatherstrip 70 and the upper end of the guide track 22 is a stabilizer assembly 50 for minimizing rattling or lateral movement of the window pane. The mounting device 40, guide follower assembly 24, stabilizer assembly 50, weatherstrip 70 and window weatherstrip 100 are fully described in the following passages in connection with the respective Figures.

Figure 5:
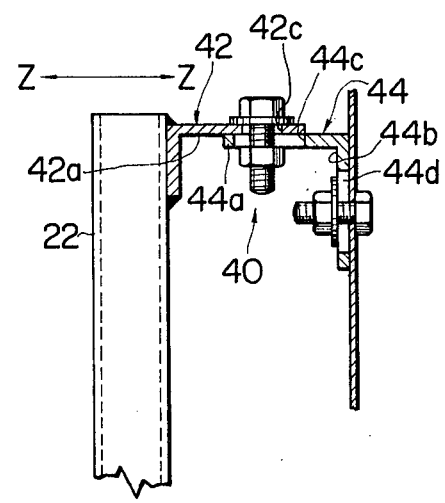
FIG. 5 is an enlarged detailed view showing a guide track mounting device of FIG. 4 mechanism.

In FIG. 5, the adjustable mounting device 40 comprises an upper L-shaped bracket 42 fixed to the upper edge of the guide track 22 and a lower L-shaped bracket 46 fixed to the lower edge of the guide track (FIG. 4).

Another L-shaped bracket 44 is provided which has one leg portion 44a bolted to a corresponding leg portion 42a of the bracket 42 and the other leg portion 44b bolted to the inner panel 11. The leg portions 42a and 44a are respectively formed with slots 42c and 44c extending in a Z—Z direction in FIG. 5, through which these leg portions are bolted together, so that the guide track 22 is limitedly adjustable in this direction. Likewise, the leg portion 44b is provided with a vertical slot 44d through which it is bolted to the inner panel 11 to permit limited vertical adjustment of the leg portion 44b with respect to the inner panel 11.

Figure 6:
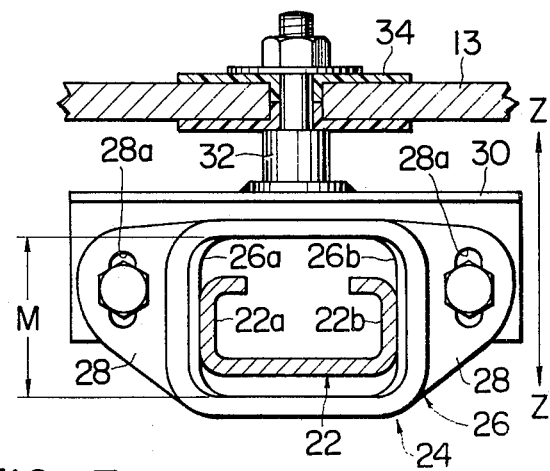
FIG. 6 is a transverse section taken along line VI—VI of FIG. 4 showing a guide following means of FIG. 4 mechanism.
Figure 7:
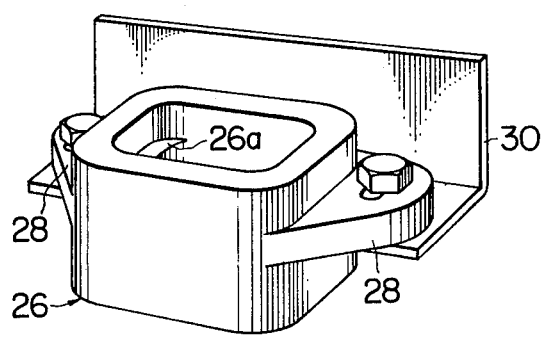
FIG. 7 is a perspective view of the guide following means shown in FIG. 6.

Guide follower assembly 24 including slide block 26 according to this preferred embodiment is illustrated in FIGS. 6 and 7. One or preferably two slide blocks 26 per guide track are secured to the lower portion of the window pane by means of an adjustable mounting element 28 as will be described. The slide block 26 is of substantially box section surrounding the guide track of channel section and is on its inner side walls formed with projected slide surfaces 26a and 26b engaging respectively with the outer side walls of the guide track. Since the lateral width of the guide track is smaller than the width M of the slide block 26, the location of the guide track relative to the slide block is adjustable within the limited range M in the direction Z—Z of FIG. 5.

The adjustable mounting element comprises support tabs 28 integrally formed on the both outer side walls of the slide block. The tabs 28 are then bolt-connected to an L-shaped bracket 30 which fixedly carries one end of a stud 32. The other end of the stud 32 is secured to the window pane 13 through elastomeric bushings 34. Both, tabs and brackets are provided with aligned elongated slots through which connecting bolts are passed, whereby lateral relationship of the slide block 26 and therefore of the window pane relative to the guide track is adjustable within the limit M. Also, a slight angular displacement of the slide block with respect to the guide track is permitted within the limit of the elongated slots.

The stabilizing assembly 50 shown in FIG. 8 essentially consists of two elastomeric stabilizing elements 52 and 54 as of rubber or felt, between which the window pane is passed at any rising and lowering movement. One stabilizing element 52 is secured to the body outer panel 12 through a support rib 56, while the other 54, with bristles 58 set on its surface adjacent the window pane, is connected to the body inner panel 11 by means of an adjustable support element 60. The support element 60 is constructed just like the mounting device 40 shown in FIG. 5 and is comprised of two L-shaped brackets 62 and 64 bolted together through elongate slots 62a and 64a. Thus, the stabilizing element 54 is again adjustable with respect to the inner panel 11 in the Z—Z direction to compensate for slight lateral displacement of the window pane.

Referring to the weatherstrip assembly 70 shown in FIG. 9, an outboard weatherstrip comprises a base portion 72 mounted on the outer panel by means of a clip 78, a lip portion 74 extending obliquely from the base portion to resiliently abut the outboard surface of the window pane and an extension 76 on the base portion directly extending toward the window pane. An inboard weatherstrip likewise comprises a clip 88, a base portion 82, a lip portion 84 and an extension 86. According to the embodiment of this invention, the base portions 72, 82 and the extensions 76 and 86 are made of hard resin, while the lip portions 74 and 84 are made from a material of higher resiliency such as rubber or soft resin. It would be thus apparent that the base portions and the extensions are expedient to form the fixed fulcrum Y—Y in FIG. 3 for the slant of the window pane, and a tight air seal between the window pane and the weatherstrip is obtained by the highly resilient lip portions.

The window weatherstrip 100 is mounted on the peripheral edge 10 of the body door or window opening through a retainer 102. The weatherstrip includes a base portion 104 and inboard and outboard lips 106 and 108 both extending from the base portion 102. The inboard and outboard lips define between them a groove 110 and are interconnected by a groove filler or bridge portion 112. A rigid clip or guide element 114 joined together with the retainer 102 to the vehicle body is extended to surround the outer contour of the outboard lip.

The embodiment of this invention with all the components shown in FIGS. 5 to 10 operates in the manner as will be hereinafter described.

Referring again to FIGS. 3 and 4, the window is raised from the lowered position along the guide track having the different radii of curvature beyond the point X. At the extremity of rising movement, the window pane assumes the position between $A_1'$ and $A_2'$. The upper peripheral edge of the window pane is then tightly pressed against the guide element 114 of the window weatherstrip 100 as indicated by a dot-dash line in FIGS. 4 and 10. This causes a resilient reaction force at the window weatherstrip which urges the window pane to slant outboard about the fulcrum Y—Y formed by the hard-material extensions 76 and 86 of the weatherstrip 70. The window pane thus slants by the distance $l$ and assumes the position between $A_o'$ and $A_1'$, the upper periphery of the window pane being located as indicated by a solid line in FIG. 10. The reaction force thus yields an elevated fluid tightness between the window pane and the window weatherstrip as previously mentioned.

If the reaction force is greater than the suction tending to move the window pane outboard due to differential pressure between the inboard and outboard window pane surfaces, the window pane is duly prevented from rattling. If such suction exceeds the reaction force as may occur in an abnormal pressure drop on the outboard window pane surface, the window pane may be laterally moved outward slightly. However, enough fluid tightness is maintained because the weatherstrip, with the increased reaction force, resiliently follows the lateral movement of the window pane. It would be readily understood that if the resilient reaction is insufficient as in prior art guide mechanisms, the window pane remains in a position indicated by a broken line in FIG. 10 wherein fluid will leak through a clearance between the outboard lip and the window pane.

As soon as the window pane, particularly at a portion fixed to the slide block, has passed beyond the point X in FIGS. 3 and 4, the window pane slants about the point Y—Y as indicated by a dot-dash line in FIG. 9 so that the distance and angle of the slide block with respect to the guide track will be changed, probably causing rattling of the window pane. This is compensated for by adjusting the location of the slide block relative to the guide track within the limit M as in FIG. 6. Also, the guide track itself is laterally adjustable relative to the body inner panel as explained above in connection with the mounting element in FIG. 5, providing smooth up and down movement of the window pane. Also, rattling of the window pane in Z—Z direction is obviated by the adjustable stabilizing assembly and by the hard plastic extensions of the weatherstrip 70.

Some additional features are included in the embodiment above, for instance, that each base portion 72 or 82 of the weatherstrip 70 is flush with its extension 76 or 86 so that the pressenger is able to rest his or her arm on the weatherstrip with the window pane being in the lowermost position, and that guide track is easily mountable to the inner panel by means of the adjustable mounting device. Not only the guide track but also the stabilizing assembly and slide block are all constructed to be adjustable to facilitate mounting on the vehicle body.

What is claimed is:

1. A vehicle window guide mechanism comprising, in combination, a slidable, curved window pane movable between a raised and a lowered position through a window storage space defined by a body of a vehicle, the window pane having a predetermined radius of curvature; a vertically curved elongate guide track mounted on the vehicle body, said guide track including a lower section having a predetermined radius of curvature which is substantially equal to the radius of curvature of the window pane and an upper section having a predetermined radius of curvature which is substantially greater than the radius of curvature of the window pane; a guide following means secured to the window pane for slidably engaging the guide track to be guided therealong; restraining means for restraining the lateral movement of the window pane at the upper edge of the window storage space during raising and lowering movement of the window pane; a resilient window weatherstrip mounted on the vehicle body adjacent the raised position of the window pane and having an inboard lip and an outboard lip, whereby the window pane during raising movement slants inboard about said restraining means to be tightly pressed against the inboard portion of the weatherstrip; the guide track being substantially a channel section and said guide following means comprising a box-section slide block substantially surrounding the guide track and having two projected slide surfaces formed on the inner side walls to slidably engage the outer side walls of the guide track; a bracket fixed to the window pane; and adjustable support means integral with the slide block for mounting the slide block on said bracket allowing a slight lateral and angular displacement of the slide block with respect to the guide track.

2. A vehicle window guide mechanism comprising, in combination, a slidable, curved window pane movable between a raised and a lowered position through a window storage space defined by a body of a vehicle, the window pane having a predetermined radius of curvature; a vertically curved elongate guide track mounted on the vehicle body, said guide track including a lower section having a predetermined radius of curvature which is substantially equal to the radius of curvature of the window pane and an upper section having a predetermined radius of curvature which is substantially greater than the radius of curvature of the window pane; a guide following means secured to the window pane for slidably engaging the guide track to be guided therealong; restraining means for restraining the lateral movement of the window pane at the upper edge of the window storage space during raising and lowering movement of the window pane; a resilient window weatherstrip mounted on the vehicle body adjacent the raised position of the window pane and having an inboard lip and an outboard lip, whereby the window pane during raising movement slants inboard about said restraining means to be tightly pressed against the inboard portion of the weatherstrip; a stabilizer assembly mounted between the restraining means and the upper edge of the guide track within the window storage space, the stabilizer assembly having an outboard elastomeric stabilizing element and an inboard elastomeric stabilizing element between which the window pane passes at any raising and lowering movement, said outboard stabilizing element being rigidly secured to an outboard wall of the window storage space; and an adjustable mounting means for mounting the inboard stabilizing element on an inboard wall of the window storage space allowing a slight lateral displacement of the inboard stabilizing element with respect to the inboard wall.

3. A vehicle window guide mechanism comprising, in combination, a slidable, curved window pane movable between a raised and a lowered position through a window storage space defined by a body of a vehicle, the window pane having a predetermined radius of curvature; a vertically curved elongate guide track mounted on the vehicle body, said guide track including a lower section having a predetermined radius of curvature which is substantially equal to the radius of curvature of the window pane and an upper section having a predetermined radius of curvature which is substantially greater than the radius of curvature of the window pane; a guide following means secured to the window pane for slidably engaging the guide track to be guided therealong; restraining means for restraining the lateral movement of the window pane at the upper edge of the window storage space during raising and lowering movement of the window pane; a resilient window weatherstrip mounted on the vehicle body adjacent the raised position of the window pane and having an inboard lip and an outboard lip, whereby the window pane during raising movement slants inboard about said restraining means to be tightly pressed against the inboard portion of the weatherstrip, and said weatherstrip assembly including a rigid guide element surrounding substantially the outer contour of an inboard lip of the weatherstrip.

* * * * *